United States Patent
Anderson et al.

(10) Patent No.: US 12,012,641 B2
(45) Date of Patent: Jun. 18, 2024

(54) COMBINED HEATING AND TRANSFER OF WORK-PIECE BLANKS

(71) Applicant: GM GLOBAL TECHNOLOGY OPERATIONS LLC, Detroit, MI (US)

(72) Inventors: Shane M. Anderson, Houghton, MI (US); Charles Enloe, Grosse Pointe Woods, MI (US); Qi Lu, Shanghai (CN); Jason J. Coryell, Rochester Hills, MI (US); Adam D. Hodges, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 424 days.

(21) Appl. No.: 17/101,243

(22) Filed: Nov. 23, 2020

(65) Prior Publication Data
US 2022/0162721 A1 May 26, 2022

(51) Int. Cl.
*C21D 9/48* (2006.01)
*B21D 22/02* (2006.01)
(Continued)

(52) U.S. Cl.
CPC ............. *C21D 9/48* (2013.01); *B21D 22/022* (2013.01); *B21D 26/053* (2013.01);
(Continued)

(58) Field of Classification Search
CPC ...... C21D 9/48; B21D 22/022; B21D 26/053; B21D 43/105
(Continued)

(56) References Cited

U.S. PATENT DOCUMENTS

| | | | |
|---|---|---|---|
| 2007/0051157 A1* | 3/2007 | Shiroza | B21D 43/05 72/405.1 |
| 2013/0037181 A1 | 2/2013 | Jin et al. | |
| 2014/0223982 A1* | 8/2014 | Lee | C21D 9/48 72/364 |

FOREIGN PATENT DOCUMENTS

| | | |
|---|---|---|
| CN | 105215160 A | 1/2016 |
| CN | 208358832 U | 1/2019 |

(Continued)

OTHER PUBLICATIONS

Machine Translation of KR20080015852A (Year: 2023).*

*Primary Examiner* — Nathaniel E Wiehe
*Assistant Examiner* — Thomas J Ward
(74) *Attorney, Agent, or Firm* — Quinn IP Law

(57) ABSTRACT

A method of forming a component includes providing a work-piece blank from a formable material. The method also includes engaging the work-piece blank with a transfer device. The method additionally includes austenitizing the work-piece blank in the transfer device via heating the blank to achieve austenite microstructure therein. The method also includes transferring the austenitized blank to a forming press using the transfer device. The method additionally includes forming the component via the forming press from the austenitized blank and quenching the formed component. A work-piece blank transfer system includes a transfer device having clamping arm(s) for engaging, holding, transferring, and releasing the work-piece blank. The transfer device also includes a heating element configured to austenitize the work-piece blank via heating the blank to achieve austenite microstructure therein. The transfer system additionally includes an electronic controller programmed to regulate the heating element and the clamping arm(s).

19 Claims, 3 Drawing Sheets

(51) Int. Cl.
  *B21D 26/053* (2011.01)
  *B21D 43/10* (2006.01)
  *B25J 9/02* (2006.01)
  *B25J 15/00* (2006.01)
  *C21D 1/42* (2006.01)
  *H05B 1/02* (2006.01)
  *H05B 3/00* (2006.01)
  *H05B 6/10* (2006.01)

(52) U.S. Cl.
  CPC ............ *B21D 43/105* (2013.01); *C21D 1/42* (2013.01); *H05B 1/023* (2013.01); *H05B 3/0023* (2013.01); *H05B 6/101* (2013.01); *B25J 9/02* (2013.01); *B25J 15/0028* (2013.01); *B25J 15/0052* (2013.01); *C21D 2211/001* (2013.01)

(58) Field of Classification Search
  USPC .............................. 219/149; 72/38, 364, 426
  See application file for complete search history.

(56)      References Cited

FOREIGN PATENT DOCUMENTS

| | | | |
|---|---|---|---|
| CN | 109590417 A | 4/2019 | |
| CN | 110180967 A | 8/2019 | |
| DE | 112004001928 B4 | 9/2006 | |
| DE | 102006037637 A1 | 2/2008 | |
| DE | 102013105488 A1 | 12/2014 | |
| DE | 102014104398 A1 | 6/2016 | |
| KR | 20080015852 A | * 2/2008 | ........... B21D 26/033 |
| KR | 20160047003 A | 5/2016 | |

* cited by examiner

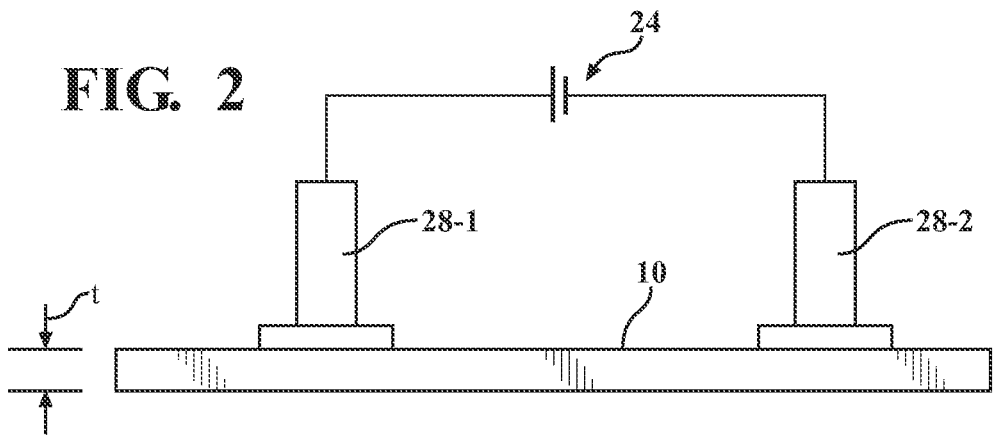
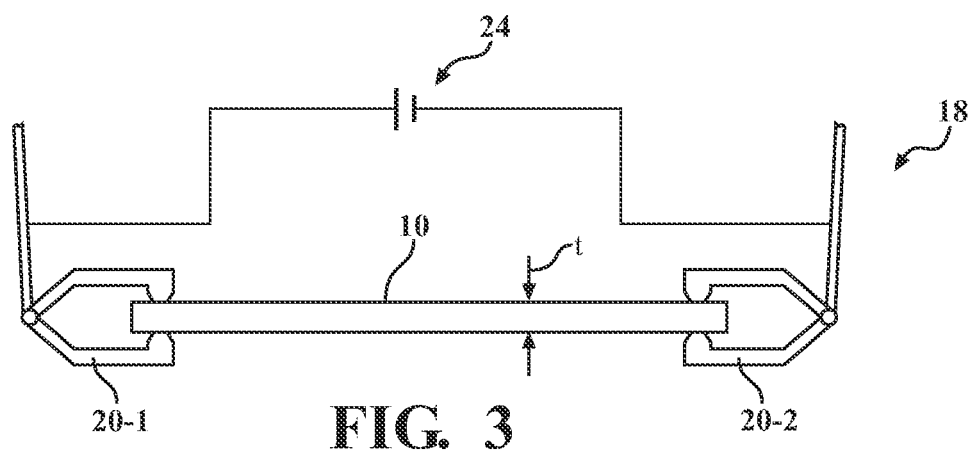
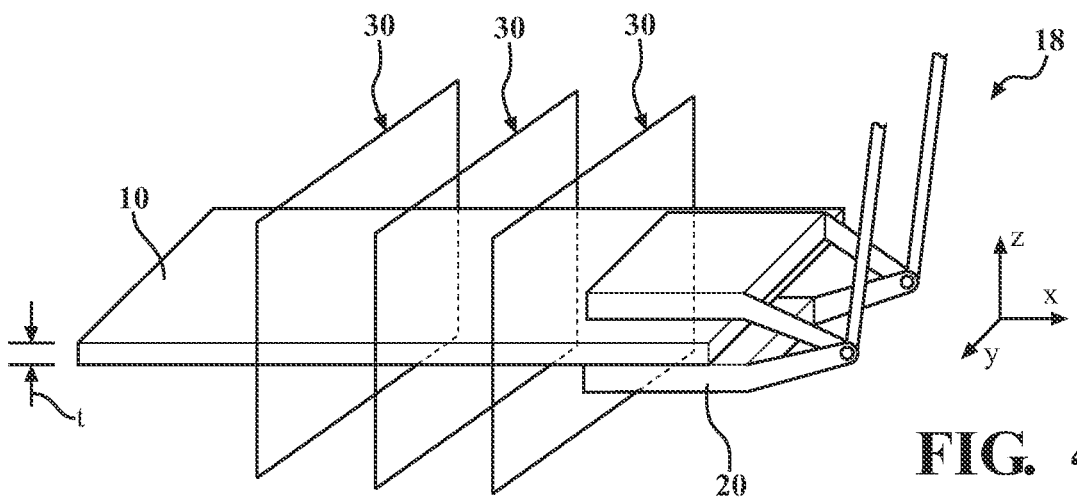

COMBINED HEATING AND TRANSFER OF WORK-PIECE BLANKS

INTRODUCTION

The present disclosure relates to a system and a method for combined heating and transfer of work-piece blanks in production of stamped components.

Stamping is a manufacturing process used for forming specifically shaped components from work-piece blanks. Stamping generally includes such forming operations as punching, blanking, embossing, bending, flanging, and coining. The process of stamping typically employs a machine press to shape or cut the work-piece blank by deforming it with a die. Stamping of a work-piece into a desired shape is frequently limited by the ability of the work-piece to withstand deformation without developing splits and tears. Such concerns are further aggravated when the work-piece blank is generated from a high-strength, lower ductility, or press-hardened steel.

Desired shape, strength, and stiffness of a stamped steel component is generally facilitated by appropriate material microstructure. Requisite material microstructure and attendant strength and stiffness of the work-piece may be achieved via austenitization and quenching heat treatment process. During austenitization the material is heated above its critical temperature long enough for transformation to austenite to take place. By changing the temperature for austenitization and/or austenitization time, the austempering process may yield different and desired microstructures. When an austenitized material is subsequently quenched, the material becomes hardened. Quenching is generally performed to a temperature and at a rate fast enough to transform austenite wholly or fractionally into martensite.

SUMMARY

A method of forming a component includes providing a work-piece blank from a formable material. The method also includes engaging the work-piece blank with a transfer device. The method additionally includes austenitizing the work-piece blank in the transfer device via heating the work-piece blank to achieve austenite microstructure therein. The method also includes transferring the austenitized work-piece blank to a forming press using the transfer device. The method additionally includes forming the component via the forming press from the austenitized work-piece blank. Furthermore, the method includes quenching the component formed from the austenitized work-piece blank.

The transfer device may include a heating element configured to austenitize the work-piece blank and at least one clamping arm configured to hold the work-piece blank in the transfer device when the work-piece blank is being austenitized. In such an embodiment, austenitizing the work-piece blank in the transfer device may be accomplished via the heating element.

The method may additionally include releasing the austenitized work-piece blank via the at least one clamping arm following transferring the austenitized work-piece blank to the forming press and prior to forming the component.

The transfer device may include a plurality of clamping arms. The heating element may be operatively connected to direct electrical current to the work-piece blank through the plurality of clamping arms. In such an embodiment, the heating element may be operatively connected to each of the plurality of clamping arms to direct electrical current to the work-piece blank through the plurality of clamping arms, and austenitizing the work-piece blank may be accomplished via resistive heating.

The heating element may encircle the work-piece blank in a predetermined plane without contacting the work-piece blank. In such an embodiment, austenitizing the work-piece blank may be accomplished via induction heating. The heating element may include an induction coil.

Austenitizing the work-piece blank may include maintaining a predetermined temperature of the work-piece blank via the heating element for a predetermined period of time.

The formable material may be press hardened steel. The predetermined temperature (depending on the grade of steel) may be in a range of 800° C. (1472° F.) to 1000° C. (1832° F.).

The predetermined period of time may be in a range of 5 seconds to 1 minute, including a predetermined time increase for every millimeter of thickness of the work-piece blank.

The transfer device may be configured as one of a linear transfer mechanism, a robotic arm, and a gantry robot.

According to the method, each of the heating element and the at least one clamping arm may be regulated by a programmable electronic controller.

An additional embodiment of the present disclosure is a work-piece blank transfer system using a transfer device having at least one clamping arm configured to engage, hold, transfer, and release the work-piece blank. The transfer device also includes a heating element configured to austenitize the work-piece blank via heating the work-piece blank to achieve austenite microstructure therein. The work-piece blank transfer system additionally includes an electronic controller programmed to regulate each of the heating element and the at least one clamping arm.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 2 is a schematic close-up partial illustration of an embodiment of the transfer device having a single clamping arm configured to hold the work-piece blank.

FIG. 3 is a schematic close-up partial illustration of one embodiment of the transfer device having a plurality of clamping arms configured to hold the work-piece blank, specifically depicting resistive heating of the work-piece blank.

FIG. 4 is a schematic close-up partial perspective illustration of an embodiment of the transfer device having a single clamping arm configured to hold the work-piece blank, specifically depicting induction heating of the work-piece blank via coils.

DETAILED DESCRIPTION

Figure 1:
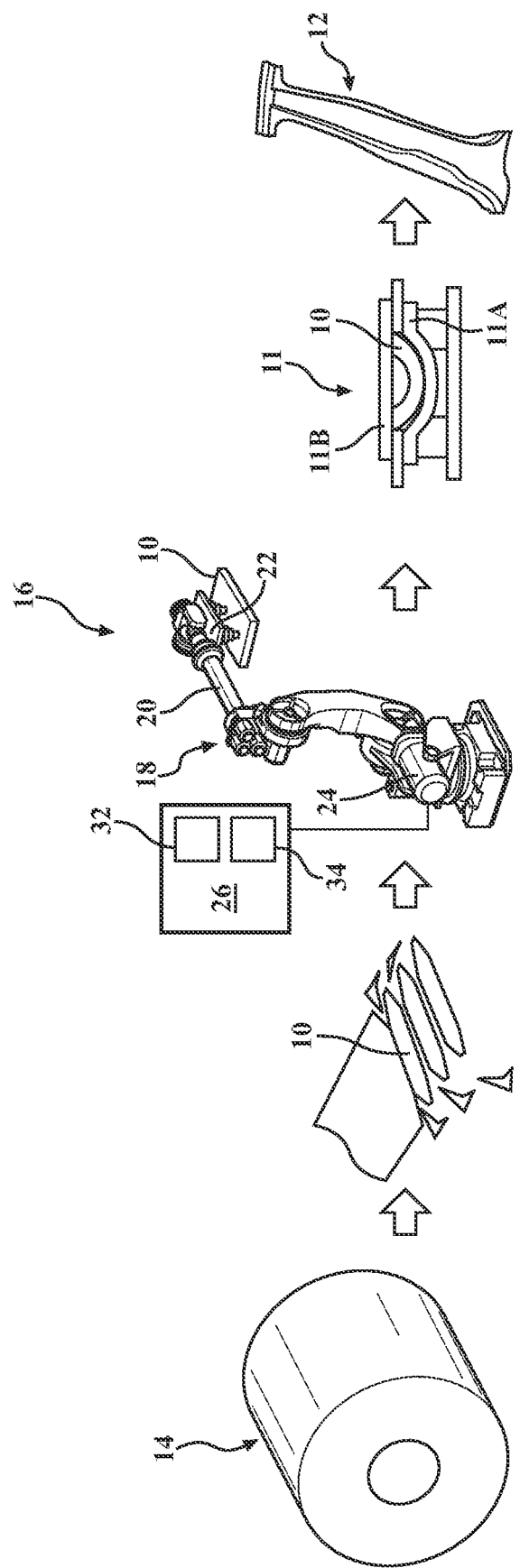
FIG. 1 is a schematic perspective illustration of a component forming process including combined austenitization and transfer of a work-piece blank in a transfer device to a forming press, according to the disclosure.

Referring to the drawings in which like elements are identified with identical numerals throughout, FIG. 1 illustrates, in detail, processing and forming, such as stamping, of a work-piece blank 10. Such work-piece blanks 10 are frequently used in manufacturing processes, such as metal stamping, to form specifically shaped components. Typically such components are formed from work-piece blanks 10 in a stamping press 11 using stamping tooling such as a die 11A and a punch 11B, as shown in FIG. 1. Each work-piece blank 10 is typically a pre-cut piece of formable material, for example sheet metal, such as cold rolled steel. A particularly suitable material for the subject work-piece blank 10, especially one used in manufacture of a structural component, may be press-hardenable steel (PHS).

PHS is a specific variety of alloyed steel that is both ductile at the high forming temperature and possesses high strength in the finished component. There are several commercially available classes of Ultra High Strength Steel (UHSS), including PHS. One other such class of UHSS is cold rolled Martensitic Steel (MS), which have superior strength, but are limited in ductility for forming at ambient temperature. The strength of MS is derived from a continuous annealing process performed prior to coiling the sheet steel via a rapid quench from high temperature, and resulting in a primarily martensitic microstructure. UHSS is generally categorized as a material having tensile strength exceeding 900 MPa. These types of steels are often used in applications requiring high strength, such as structural components and reinforcements of motor vehicles. UHSS permits such components to maintain required strength while using a thinner gauge material. UHSS may be processed via press hardening, a.k.a., hot stamping or hot press forming, which allows these steels to be formed into complex shapes not commonly possible with regular cold stamping operations.

To produce a stamped component 12 having a desired final shape or contour, the work-piece blank 10 is generally provided from a roll 14 of particular material, for example the PHS described above, and having a prescribed thickness t. The work-piece blank 10 is generally cut from the roll 14 of PHS. The work-piece blank 10 is then handled by a work-piece blank transfer system 16. As shown in FIG. 1, the work-piece blank transfer system 16 includes a transfer device 18. For example, the transfer device 18 may be configured as either a gantry robot (shown in FIGS. 1-2) or a linear transfer mechanism (shown in FIGS. 3-4). As shown in FIGS. 1 and 3-4, the transfer device 18 includes one or more clamping arms 20 configured to engage, hold, transfer, and release the work-piece blank 10. The transfer device 18 also includes a heating element 22 (generally shown in FIG. 1) configured to austenitize the work-piece blank 10 via heating the work-piece blank to achieve full austenite microstructure therein.

Generally, austenitizing is a hardening process used on iron-based metals to promote better mechanical properties of the material. Specifically, the purpose of austenitizing steel and other ferrous alloys is to transform them into the required shape and to provide strength and resistance to the material. The temperature at which the steel and ferrous alloys are heated above their critical temperatures is called the austenitizing temperature. Typically, the austenitizing temperature range varies for steels with different alloying elements and their amounts. After the metal is heated into the austenite region, it is then quenched in a water-cooled die or other heat extraction medium. Generally, once the austenitizing temperature is attained, proper microstructure and full hardness of steel via further heat treatment processes may be attained.

As shown in FIGS. 1 and 2, the heating element 22 may include and be energized by a power source 24, such as one or more batteries or electrical capacitors configured to direct electrical current through the work-piece blank 10. For example, the heating element 22 may be configured to treat the work-piece blank 10 via direct conduction of energy (FIGS. 2-3) or via electromagnetic induction (FIG. 4). The work-piece blank transfer system 16 also includes an electronic controller 26 programmed to regulate each of the heating element 22 and the clamping arm(s) 20. The electronic controller 26 may include a central processing unit (CPU) programmed to control the transfer device 18, including the clamping arm(s) 20 and the heating element 22. The electronic controller 26 includes a processor and tangible, non-transitory memory, which includes instructions for operation of the transfer device 18 programmed therein. The controller's memory may be an appropriate recordable medium that participates in providing computer-readable data or process instructions. Such a recordable medium may take many forms, including but not limited to non-volatile media and volatile media.

Non-volatile media for the electronic controller 26 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, and wires of a system bus coupled to a processor of a computer, or via a wireless connection. Memory of the electronic controller 26 may also include a flexible disk, hard disk, magnetic tape, another magnetic medium, a CD-ROM, DVD, another optical medium, etc. The electronic controller 26 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 26 or accessible thereby may be stored in the memory and automatically executed to provide the required functionality of the transfer device 18.

The transfer device 18 may specifically include a plurality of clamping arms 20, such as the first and second arms 20-1, 20-2 shown in FIG. 3. As further shown in FIG. 3, the power source 24 of the heating element 22 may be in direct contact with the work-piece blank 10 via the first and second arms 20-1, 20-2 to direct electrical current to the subject work-piece blank through the subject clamping arms. Alternatively, as shown in FIG. 2, the power source 24 of the heating element 22 may be connected to the work-piece blank 10 via contacts 28-1, 28-2 to direct electrical current to the subject work-piece blank therethrough. Each of the set-ups depicted in FIGS. 2-3 is specifically configured to austenitize the work-piece blank 10 via resistive heating. Alternatively, as shown in FIG. 4, one or more clamping arms 20 (although only one arm is shown) may be arranged to grasp the work-piece blank 10, but without a provision to convey electrical or thermal energy thereto. In such an embodiment, the heating element 22 may additionally include one or more induction coils 30 configured to encircle the work-piece blank 10 in a predetermined plane, such as the Y-Z plane, but without physically contacting the work-piece blank. The set-up of FIG. 4 is specifically configured to austenitize the work-piece blank 10 via induction heating.

With resumed reference to FIG. 1, the electronic controller 26 may be additionally programmed to maintain a predetermined temperature 32 of the work-piece blank 10 via the heating element 22 for a predetermined period of time 34. The predetermined temperature 32 is dependent on the grade of steel of the work-piece blank 10 and is intended to fall in a range of 800° C. (1472° F.) to 1000° C. (1832° F.). The predetermined period of time 34 may be empirically determined to bring and maintain material of the work-piece blank 10 in the austenite region. The predetermined period of time 34 at the predetermined temperature 32 may be selected and programmed into the controller 26 based on the particular material and thickness t of the subject work-piece blank 10. Specifically, the predetermined period of time 34 may be equal to 1-5 seconds plus a predetermined time adjustment or increase, such as 5-10 seconds, for every millimeter of thickness t of the work-piece blank 10. The overall predetermined period of time 34 may generally fall in a range of 5 seconds to 1 minute. After the work-piece blank 10 is heated into the austenite region, the work-piece blank may be formed into the desired shape.

Figure 5:
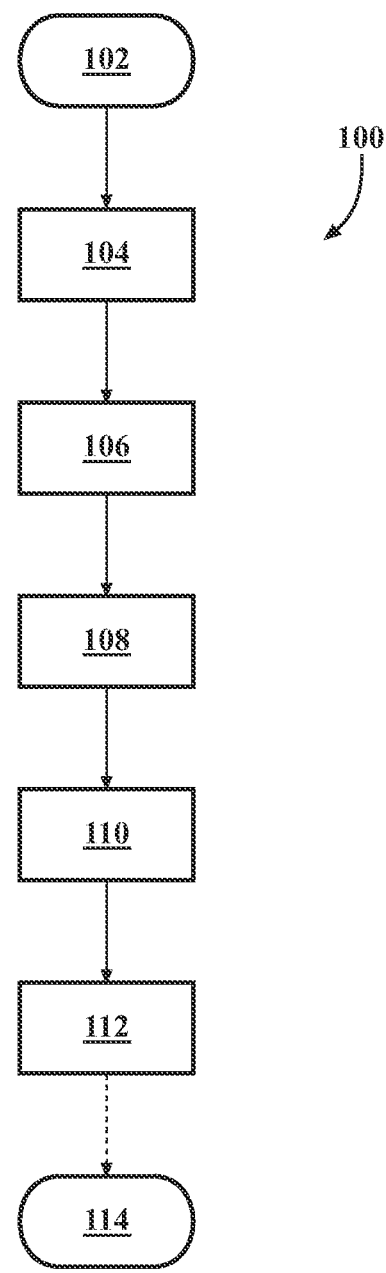
FIG. 5 is a flow chart illustrating a method of forming a component employing the combined austenitization and transfer of a work-piece blank in a transfer device shown in FIGS. 1-4.

FIG. 5 depicts a method 100 of forming the component 12 from the work-piece blank 10 using the stamping press 11 and the work-piece blank transfer system 16 shown in and described above with respect to FIGS. 1-4. The work-piece blank 10 may be provided from Press Hardenable Steel (PHS), as described above with respect to FIGS. 1-4, while the final component 12 with the desired stamped contour may be a structural part for a motor vehicle (not shown). The method 100 commences in frame 102 where it includes providing the work-piece blank 10 from a formable material, for example cut from the roll 14 of subject material, such as the press hardenable steel (PHS) discussed above. The method then proceeds to frame 104. In frame 104, the method includes engaging the work-piece blank 10 with the transfer device 18.

After frame 104, the method advances to frame 106. In frame 106, the method includes austenitizing the work-piece blank 10 in the transfer device 18 via heating the work-piece blank to achieve austenite microstructure therein. As described with respect to FIGS. 1-4, the transfer device 18 may include the heating element 22 and at least one clamping arm 20 configured to hold the work-piece blank 10 in the transfer device when the work-piece blank is being austenitized. In such an embodiment, austenitizing the work-piece blank 10 may be accomplished via the heating element 22 as the clamping arm 20 holds the work-piece blank. In frame 106, austenitizing the work-piece blank 10 may include maintaining the predetermined temperature 32 of the work-piece blank via the heating element 22 for the predetermined period of time 34 via the electronic controller 26.

As described above with respect to FIGS. 1-4, the transfer device 18 may specifically include a plurality of clamping arms, such as the first and second arms 20-1, 20-2. In such an embodiment, the heating element 22 may be operatively connected to each of the clamping arms 20 to direct electrical current to the work-piece blank 10 through the subject clamping arms. Furthermore, austenitizing the work-piece blank 10 may then be accomplished via resistive heating where the electrical current is directed to the work-piece blank through the clamping arms. Alternatively, in frame 106 the heating element 22 may include the induction coil(s) 30 configured to encircle the work-piece blank 10 in a predetermined plane, such as the plane Y-Z plane (shown in FIG. 4). In such an embodiment, austenitizing the work-piece blank 10 may be accomplished via induction heating.

Following the austenitizing of the work-piece blank 10, the method proceeds to frame 108. In frame 108, the method includes transferring the austenitized work-piece blank 10 to the forming press 11 using the transfer device 18. In frame 108, the method may further include releasing the austenitized work-piece blank 10 via the clamping arm(s) 20 following transferring the austenitized work-piece blank to the forming press 11, i.e., prior to proceeding to frame 110. After frame 108, the method moves on to frame 110, where the method includes forming the component 12 via the forming press 11 from the austenitized work-piece blank 10. Following frame 110, the method advances to frame 112. In frame 112 the method includes quenching the component 12 formed from the austenitized work-piece blank 10, such as in a water-cooled die, as referenced above. Following frame 112, the method may proceed to and conclude in frame 114 with trimming excess material, washing, and/or packaging the final component 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of forming a component, the method comprising:
   providing a work-piece blank from a formable material;
   engaging the work-piece blank with a transfer device;
   austenitizing the work-piece blank in the transfer device via heating the work-piece blank to achieve austenite microstructure therein, wherein:
      the transfer device includes a heating element and at least one clamping arm configured to hold the work-piece blank in the transfer device when the work-piece blank is being austenitized;
      austenitizing the work-piece blank in the transfer device is accomplished via the heating element;
      the heating element encircles the work-piece blank in a predetermined plane; and
      austenitizing the work-piece blank is accomplished via induction heating;
   transferring the austenitized work-piece blank to a forming press using the transfer device;
   forming the component via the forming press from the austenitized work-piece blank; and
   quenching the component formed from the austenitized work-piece blank.

2. The method of forming the component of claim 1, further comprising releasing the austenitized work-piece blank via the at least one clamping arm following transferring the austenitized work-piece blank to the forming press and prior to forming the component.

3. The method of forming the component of claim 1, wherein:
   the at least one clamping arm includes a plurality of clamping arms;
   the heating element is operatively connected to each of the plurality of clamping arms to direct electrical current to the work-piece blank through the plurality of clamping arms, and austenitizing the work-piece blank is accomplished via resistive heating;

the method further comprising directing electrical current to the work-piece blank through the plurality of clamping arms.

4. The method of forming the component of claim 1, wherein the heating element includes an induction coil.

5. The method of forming the component of claim 1, wherein austenitizing the work-piece blank includes maintaining a predetermined temperature of the work-piece blank via the heating element for a predetermined period of time.

6. The method of forming the component of claim 5, wherein the formable material is press hardened steel, and wherein the predetermined temperature is in a range of 800° C. (1472° F.) to 1000° C. (1832° F.).

7. The method of forming the component of claim 5, wherein the predetermined period of time is in a range of 5 seconds to 1 minute, including a predetermined time increase for every millimeter of thickness of the work-piece blank.

8. The method of forming the component of claim 1, wherein the transfer device is configured as one of a linear transfer mechanism, a robotic arm, and a gantry robot, further comprising regulating each of the heating element and the at least one clamping arm via an electronic controller.

9. A work-piece blank transfer system comprising:
a transfer device having:
at least one clamping arm configured to engage, hold, transfer, and release a work-piece blank; and
a heating element configured to austenitize the work-piece blank via heating the work-piece blank to achieve austenite microstructure therein, wherein the heating element includes an induction coil encircling the work-piece blank in a predetermined plane and configured to austenitize the work-piece blank via induction heating; and
an electronic controller programmed to regulate each of the heating element and the at least one clamping arm.

10. The work-piece blank transfer system of claim 9, wherein:
the at least one clamping arm includes a plurality of clamping arms; and
the heating element is operatively connected to each of the plurality of clamping arms to direct electrical current to the work-piece blank through the plurality of clamping arms and configured to austenitize the work-piece blank via resistive heating.

11. The work-piece blank transfer system of claim 9, wherein the electronic controller is additionally programmed to maintain a predetermined temperature of the work-piece blank via the heating element for a predetermined period of time.

12. The work-piece blank transfer system of claim 11, wherein the predetermined temperature (depending on the grade of steel) is in a range of 800° C.(1472° F.) to 1000° C. (1832° F.).

13. The work-piece blank transfer system of claim 11, wherein the predetermined period of time is in a range of 5 seconds to 1 minute, including a predetermined time increase for every millimeter of thickness of the work-piece blank.

14. The work-piece blank transfer system of claim 9, wherein the transfer device is configured as one of a linear transfer mechanism, a robotic arm, and a gantry robot.

15. A method of forming a component, the method comprising:
providing a work-piece blank from press hardened steel (PHS);
engaging the work-piece blank with a transfer device having a heating element and at least one clamping arm;
holding the work-piece blank via the at least one clamping arm;
austenitizing, via induction heating using the heating element, the work-piece blank in the transfer device via heating the work-piece blank to achieve austenite microstructure therein, wherein:
austenitizing the work-piece blank includes maintaining a predetermined temperature of the work-piece blank for a predetermined period of time in a range of 5 seconds to 1 minute, including a predetermined time increase for every millimeter of thickness of the work-piece blank, via the heating element for a predetermined period of time;
transferring the austenitized work-piece blank to a forming press using the transfer device;
releasing the austenitized work-piece blank via the at least one clamping arm following transferring the austenitized work-piece blank to the forming press;
forming the component via the forming press from the austenitized work-piece blank; and
quenching the component formed from the austenitized work-piece blank.

16. The method of forming the component of claim 6, wherein each of the heating element and the at least one clamping arm is regulated by an electronic controller programmed with an algorithm to control the transfer device.

17. The method of forming the component of claim 16, wherein maintaining the predetermined temperature of the work-piece blank via the heating element for the predetermined period of time is programmed into and accomplished via the electronic controller.

18. The method of forming the component of claim 15, wherein each of the heating element and the at least one clamping arm is regulated by an electronic controller programmed with an algorithm to control the transfer device, wherein the predetermined temperature is in a range of 800° C. (1472° F.) to 1000° C. (1832° F.), and wherein maintaining the predetermined temperature of the work-piece blank via the heating element is programmed into and accomplished via the electronic controller.

19. The method of forming the component of claim 15, wherein:
the at least one clamping arm includes a plurality of clamping arms; and
the heating element includes an induction coil configured to encircle the work-piece blank in a predetermined plane.

* * * * *